US012172480B2

(12) United States Patent
Ganahl

(10) Patent No.: US 12,172,480 B2
(45) Date of Patent: Dec. 24, 2024

(54) AMPHIBIOUS VEHICLE SYSTEMS

(71) Applicant: Joseph Ganahl, Honolulu, HI (US)

(72) Inventor: Joseph Ganahl, Honolulu, HI (US)

( * ) Notice: Subject to any disclaimer, the term of this patent is extended or adjusted under 35 U.S.C. 154(b) by 32 days.

(21) Appl. No.: 18/105,830

(22) Filed: Feb. 4, 2023

(65) Prior Publication Data

US 2024/0109379 A1 Apr. 4, 2024

Related U.S. Application Data

(60) Provisional application No. 63/412,447, filed on Oct. 1, 2022.

(51) Int. Cl.
*B60F 3/00* (2006.01)
*B60L 50/64* (2019.01)
(Continued)

(52) U.S. Cl.
CPC ............ *B60F 3/0007* (2013.01); *B60L 50/64* (2019.02); *B63B 1/121* (2013.01); *B63B 5/24* (2013.01); *B63B 49/00* (2013.01); *B63B 79/15* (2020.01); *B63H 1/14* (2013.01); *B63H 21/17* (2013.01); *B63H 25/42* (2013.01); *B64C 37/00* (2013.01); *G05D 1/0016* (2013.01);
(Continued)

(58) Field of Classification Search
CPC .......... B60F 3/0007; B60F 3/00; B60L 50/64; B63B 79/15; B63B 1/121; B63B 5/24; B63B 49/00; B63H 1/14; B63H 21/17; B63H 25/42; B64C 37/00; G05D 1/0016; G05D 1/0012
See application file for complete search history.

(56) References Cited

U.S. PATENT DOCUMENTS 2,400,132 A * 5/1946 Porter .................. B60F 3/0076
180/196
5,690,046 A * 11/1997 Grzech, Jr. ........... B60F 3/0053
440/12.5
(Continued)

FOREIGN PATENT DOCUMENTS

CN 106427433 A * 2/2017 ................ B60F 3/00
CN 107697234 A * 2/2018
(Continued)

*Primary Examiner* — Benjamin P Lee
(74) *Attorney, Agent, or Firm* — Edmond DeFrank

(57) ABSTRACT

The embodiments disclose an amphibious vehicle system including a unibody, one-piece watertight buoyant body structure, filled with closed cell foam to create buoyancy in case of leakage, configured to carry at least one user and cargo, at least one motor drive system having at least one waterproof battery module, replaceable in a watertight compartment, coupled to the watertight buoyant body structure configured to drive at least one propulsion system to propel the amphibious vehicle on land, a twin hulled front portion segueing to a single rear hull housing the motor and differential with water channels to allow water flow to propeller, at least one boat propeller water propulsion system coupled to a pivoting self-contained motor configured to propel the amphibious vehicle through water, wherein the self-contained motor is configured to steer the amphibious vehicle in water, and a steering system configured to control wheels and propellers simultaneously.

11 Claims, 16 Drawing Sheets

(51) Int. Cl.
    *B63B 1/12*     (2006.01)
    *B63B 5/24*     (2006.01)
    *B63B 49/00*     (2006.01)
    *B63B 79/15*     (2020.01)
    *B63H 1/14*     (2006.01)
    *B63H 21/17*     (2006.01)
    *B63H 25/42*     (2006.01)
    *B64C 37/00*     (2006.01)
    *G05D 1/00*     (2006.01)

(52) U.S. Cl.
    CPC ........ *G05D 1/0022* (2013.01); *B60L 2200/10* (2013.01); *B60L 2200/32* (2013.01)

(56) References Cited

U.S. PATENT DOCUMENTS

| | | | | |
|---|---|---|---|---|
| 6,386,929 | B1* | 5/2002 | Baker | B60N 2/507 440/12.5 |
| 6,540,569 | B1* | 4/2003 | Gong | B62K 13/00 440/12.5 |
| 7,207,851 | B1* | 4/2007 | Gibbs | B60F 3/0007 440/12.5 |
| 7,311,567 | B2* | 12/2007 | Gibbs | B62K 9/00 440/12.5 |
| 8,025,540 | B2* | 9/2011 | Gibbs | B60G 3/20 440/12.5 |
| 8,221,174 | B2* | 7/2012 | March | B60F 3/003 440/12.5 |
| 9,511,640 | B2* | 12/2016 | Gibbs | B60F 3/0084 |
| 9,555,678 | B2* | 1/2017 | Gibbs | B60F 3/0046 |
| 9,555,680 | B2* | 1/2017 | Gibbs | B60F 3/0084 |
| 10,081,424 | B2* | 9/2018 | Radu | B64C 29/0033 |
| 11,084,346 | B2* | 8/2021 | Fisher | B60F 3/0015 |
| 11,364,756 | B2* | 6/2022 | Gibbs | B60F 3/0007 |
| 11,893,160 | B2* | 2/2024 | Tran | B64D 43/00 |
| 2001/0047894 | A1* | 12/2001 | Maguire | B62K 5/01 180/9.5 |
| 2003/0236037 | A1* | 12/2003 | Matthews | B60F 3/0007 440/12.51 |
| 2006/0172627 | A1* | 8/2006 | Gibbs | B62K 9/00 440/12.5 |
| 2008/0108257 | A1* | 5/2008 | Gibbs | B60F 3/0046 440/12.51 |
| 2009/0061702 | A1* | 3/2009 | March | B60F 3/0007 440/12.51 |
| 2012/0108118 | A1* | 5/2012 | Longdill | B60F 3/0069 440/12.52 |
| 2012/0220176 | A1* | 8/2012 | Neprud | B60F 3/00 440/12.5 |
| 2013/0078876 | A1* | 3/2013 | Page | B63H 21/17 440/12.51 |
| 2014/0004761 | A1* | 1/2014 | Neprud | B60F 3/0069 440/12.5 |
| 2015/0038027 | A1* | 2/2015 | Park | B60F 3/0007 440/12.5 |
| 2015/0087194 | A1* | 3/2015 | Gibbs | B60F 3/0038 440/12.56 |
| 2016/0031275 | A1* | 2/2016 | Monroe | B64U 10/70 244/2 |
| 2016/0114887 | A1* | 4/2016 | Zhou | B60F 5/02 348/148 |
| 2016/0272314 | A1* | 9/2016 | Radu | B60F 5/02 |
| 2016/0332494 | A1* | 11/2016 | Russell | B60F 3/0007 |
| 2016/0368338 | A1* | 12/2016 | Pezza | B63B 32/40 |
| 2017/0160738 | A1* | 6/2017 | Ganz | H04W 4/40 |
| 2017/0240014 | A1* | 8/2017 | Gibbs | B60F 3/0069 |
| 2020/0254838 | A1* | 8/2020 | Fisher | B60F 3/0015 |
| 2021/0039461 | A1* | 2/2021 | Gibbs | B60F 3/0038 |
| 2023/0347699 | A1* | 11/2023 | Tice | B60F 3/0015 |
| 2024/0103638 | A1* | 3/2024 | Tran | G06F 3/017 |
| 2024/0126279 | A1* | 4/2024 | Patel | B62D 15/0285 |

FOREIGN PATENT DOCUMENTS

| | | | | |
|---|---|---|---|---|
| CN | 109606040 | A * | 4/2019 | |
| CN | 110341406 | A * | 10/2019 | |
| CN | 110341896 | A * | 10/2019 | |
| CN | 113135077 | A * | 7/2021 | B60F 3/00 |
| CN | 113147291 | A * | 7/2021 | B60F 3/0007 |
| CN | 114132442 | A * | 3/2022 | |
| CN | 114407592 | A * | 4/2022 | B60F 3/0015 |
| CN | 116101000 | A * | 5/2023 | |
| GB | 2254831 | A * | 10/1992 | B60F 3/0084 |
| GB | 2254831 | B * | 1/1995 | B60F 3/0084 |
| GB | 2442214 | A * | 4/2008 | B60F 3/0023 |
| GB | 2452088 | A * | 2/2009 | B60F 3/00 |
| GB | 2605662 | A * | 10/2022 | B60F 3/00 |
| KR | 20190103851 | A * | 9/2019 | B60B 9/28 |
| WO | WO-2006054073 | A2 * | 5/2006 | B60F 3/003 |
| WO | WO-2006054073 | A3 * | 10/2007 | B60F 3/003 |

* cited by examiner

AMPHIBIOUS VEHICLE SYSTEMS

CROSS-REFERENCED TO RELATED APPLICATIONS

This patent application is based on U.S. Provisional Patent Application Ser. No. 63/412,447 filed Oct. 1, 2022, entitled "AMPHIBIOUS VEHICLE SYSTEMS", by Joseph Ganahl, the U.S. patent application being incorporated herein by reference.

BACKGROUND

Currently, there exists a range of electric vehicle systems designed for on and off-road usage. Generally, these systems are limited to land use. A separate system is necessary for use in the water. As flooding incidents become more common, the benefits of an amphibious system become more obvious for disaster relief support. Commercial operations like farms and ranches will also receive beneficial enhancements for increased access to land and water. There is also a substantial recreational opportunity for fishermen, hunters, campers, and others wanting to enjoy the ability to operate on land or water.

DETAILED DESCRIPTION OF THE INVENTION

In the following description, reference is made to the accompanying drawings, which form a part hereof, and which are shown by way of illustration a specific example in which the invention may be practiced. It is to be understood that other embodiments may be utilized, and structural changes may be made without departing from the scope of the present invention.

General Overview:

It should be noted that the descriptions that follow, for example, in terms of an amphibious vehicle system method and devices are described for illustrative purposes and the underlying system can apply to any number and multiple types and styles of vehicles. In one embodiment of the present invention, the amphibious vehicle can be configured in a 3-wheel system. The amphibious vehicle system method and devices can be configured to include 2 wheels or multiple wheels using the present invention.

Figure 1:
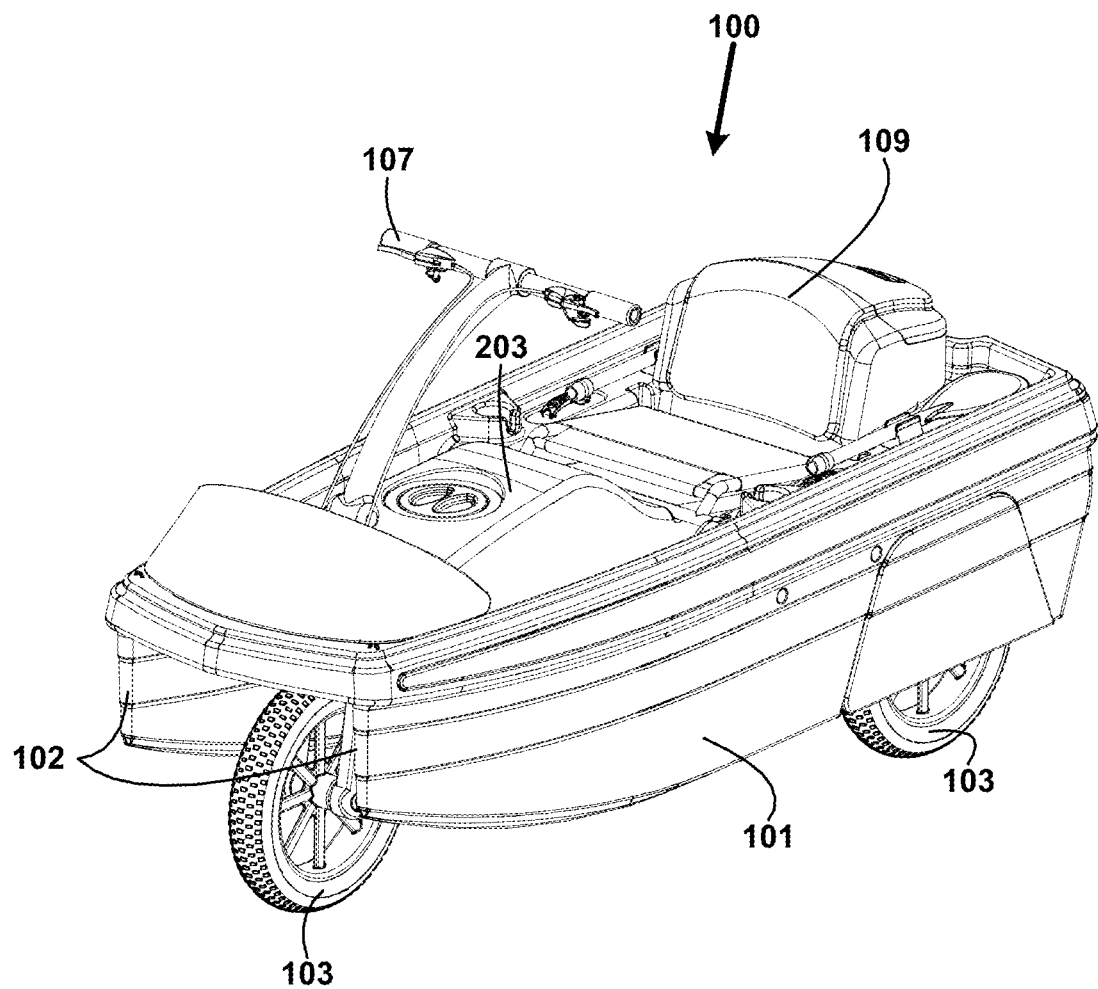
FIG. 1 shows for illustrative purposes only an example of an amphibious tricycle front/top view of one embodiment.

FIG. 1 shows for illustrative purposes only an example of an amphibious vehicle of one embodiment. FIG. 1 shows an amphibious vehicle 100. An amphibious vehicle system including a watertight buoyant body structure 101 that allows operation in water. The watertight buoyant body structure 101 is also referred to herein as a unibody and configured with a twin hulled 102 front portion segueing to a single rear hull. The amphibious vehicle system method and devices include at least three 104 wheels 103, handlebar 107, waterproof removable battery module/packs 203 (not showing), and the seat 109 with a seat back storage compartment. The amphibious vehicle system is a floating system with wheels 103 for land travel with the front wheel or wheels turning for steerage.

The amphibious vehicle system includes a unibody which is a one-piece watertight buoyant body structure, filled with closed cell foam to create buoyancy in case of leakage, configured to carry at least one user and cargo. At least one motor drive system having at least one waterproof battery module, replaceable in a watertight compartment, coupled to the watertight buoyant body structure configured to drive at least one propulsion system to propel the amphibious vehicle with at least three wheels on land. The amphibious vehicle system includes a twin hulled front portion segueing to a single rear hull housing the motor and differential with water channels to allow water flow to a propeller. At least one boat propeller water propulsion system coupled to a self-contained motor that pivots configured to propel the amphibious vehicle through water, wherein the self-contained motor is configured to steer the amphibious vehicle in water. The amphibious vehicle system also includes a steering system configured to control wheels and propellers simultaneously.

In one embodiment the amphibious vehicle system also includes a plurality of cameras coupled to a rear section, front section, and both sides of the amphibious vehicle to transmit images to an app on a user's mobile device of surroundings of the amphibious vehicle even when not in use. In another embodiment the amphibious vehicle system includes a plurality of cameras including an underwater camera coupled to an altimeter and a depth finder coupled to a bottom section of the amphibious vehicle to determine a depth of the water and an altitude while in flight. In another embodiment the amphibious vehicle system includes an app on a user's mobile device wirelessly coupled to a controller configured to remotely control the amphibious vehicle.

A plurality of sensors coupled to interior and exterior sections of the amphibious vehicle to detect various environmental and physical conditions surrounding the amphibious vehicle. A quad-air propeller system with a propeller configured to be rotated by an integrated brushless hub motor powered by at least one waterproof battery pack. A navigation system having electronic devices wherein the electronic devices include a route mapping device to gather and display data of a user-delineated route with date/time, GPS coordinates, weather conditions, lunar phases, tide stage, and user stop locations.

The amphibious vehicle system also include waterproof removable battery modules/packs, and a watertight buoyant body structure 101. These amphibious systems are designed for low-cost and practical production in 2, 3, 4, or multi-wheel configurations. A quad-air propeller system is installed on the Amphibious Vehicles to provide the ability to pass over obstacles such as river rapids, fallen trees avalanches, or other impediments. The quad-air propeller system is removably coupled to the twin-hulled 102 watertight buoyant body structure elevated above the user configured to hover the amphibious vehicle at a low level and move a short flight distance over obstacles. The unibody is made of molded plastic, metal, carbon, and other water-resistant materials. A metal structural brace coupled to the watertight buoyant body structure configured to provide additional support for heavy load carrying capacity.

In another embodiment, the air propeller system includes more than four air propellers. Water propulsion is provided by a boat propeller, paddle-wheel drive system 701, or a combination of both. Water steering is accomplished by a self-contained motor that pivots coupled to the propeller for the steerage of the amphibious vehicle 100 of FIG. 1 while in water connected to a handlebar or steering wheel.

The amphibious vehicle system method and devices allow users to purchase one system that is adaptable in many ways for use in any environment. A user gains the ability to drive one system from land into the water and vice versa with the additional ability of short flight over obstacles. The user gains the ability to tow trailers across land or water to deliver supplies, equipment, or food to diverse destinations. The amphibious vehicle system method and devices include expandable, replaceable, and stackable waterproof battery packs housed in a watertight compartment allowing extended usage times. Transportation is ubiquitous and used by all ages over 5 and both sexes. The rugged, buoyant, and waterproof natures of the amphibious vehicle system method and device products lend themselves, especially to marine and outdoor environments.

Invention Operation:

The battery module/packs are connected to the motor assembly via a speed controller to provide electrical power and regulate RPM. The speed controller is regulated by a twist grip throttle on the handlebar in one embodiment or a floor pedal in another embodiment. The battery module housing is waterproof and the battery module compartment is watertight alleviating the risk of water damage.

The motor assembly includes a differential that allows drive wheels to rotate at different speeds for cornering in one embodiment. The differential is connected directly to axles which turn the wheels and, in some embodiments, paddle-wheel drive system 701. The motor assembly also includes an electromagnetic braking system for concise driving and parking brakes. Water propulsion is also obtained through a propeller system driven by a geared assembly connecting the motor assembly to the propeller shaft or a combination of paddle-wheel drive system 701 and propeller. Other embodiments include individual electric motors directly connected to individual wheels.

Rugged, Hydrodynamic, and Buoyant Body:

Waterproof and airtight, tough, durable bodies provide buoyancy to allow vehicles to float and operate in water. Other embodiments are configured for different wheel combinations, structures will be streamlined for hydrodynamic performance and cosmetically attractive for land usage. Roto molding is used in one embodiment for low-cost manufacturing. Other plastic, metals, carbon, and other materials are used in other embodiments.

Battery Module:

Fully self-contained and waterproof battery modules contain multiple battery cells, waterproof sealed, and enclosed within a nesting body. The top of the battery module contains a double O-ring for a waterproof seal. The bottom of the module contains two flat metal tabs aligned to connect with Pogo Pins in the compartment for electrical power conductance. Battery Modules contain a proprietary PCBA with multiple safety circuits for protection during discharge and charge operation. The PCBAs will modulate and control electrical flow between modules providing multiple safety levels including over/under current, over/under charge, and over/under discharge during both usage and charging when multiple modules are connected. The PCBAs will also detect low charge levels and alert the user to the charge status.

Steering:

Handlebars are directly connected to the front wheel and control turning on land in one embodiment. Other embodiments incorporate a steering wheel controlling dual front wheels. A self-contained motor that pivots coupled to an aquatic propeller configured to steer using the handlebars the amphibious vehicle in water environments. A throttle grip controls speed and a hand brake lever controls braking in one embodiment. Other embodiments use foot levers to accomplish these functions.

DETAILED DESCRIPTION

Figure 2:
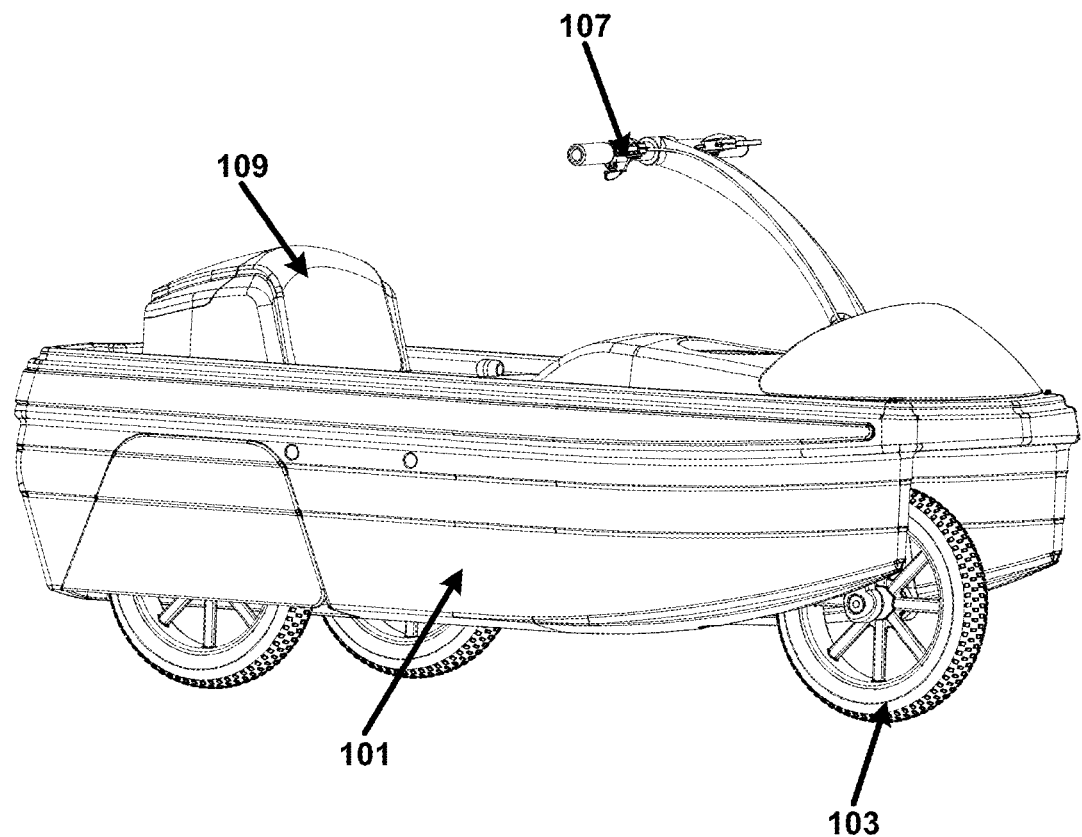
FIG. 2 shows for illustrative purposes only an example of an amphibious tricycle side view of one embodiment.

FIG. 2 shows for illustrative purposes only an example of an amphibious tricycle side view of one embodiment. FIG. 2 shows seat 109, handlebar 107, the watertight buoyant body structure 101, and wheels 103. The seat 109 includes a seat back with a storage compartment. The handlebar 107 is configured with a throttle lever to regulate the speed and a braking lever to apply braking as needed. The wheels 103 are shown in a 3-wheel configuration for an amphibious tricycle. In the amphibious tricycle, the front wheel is the steering device operated with the handlebar 107 of one embodiment.

Figure 3:
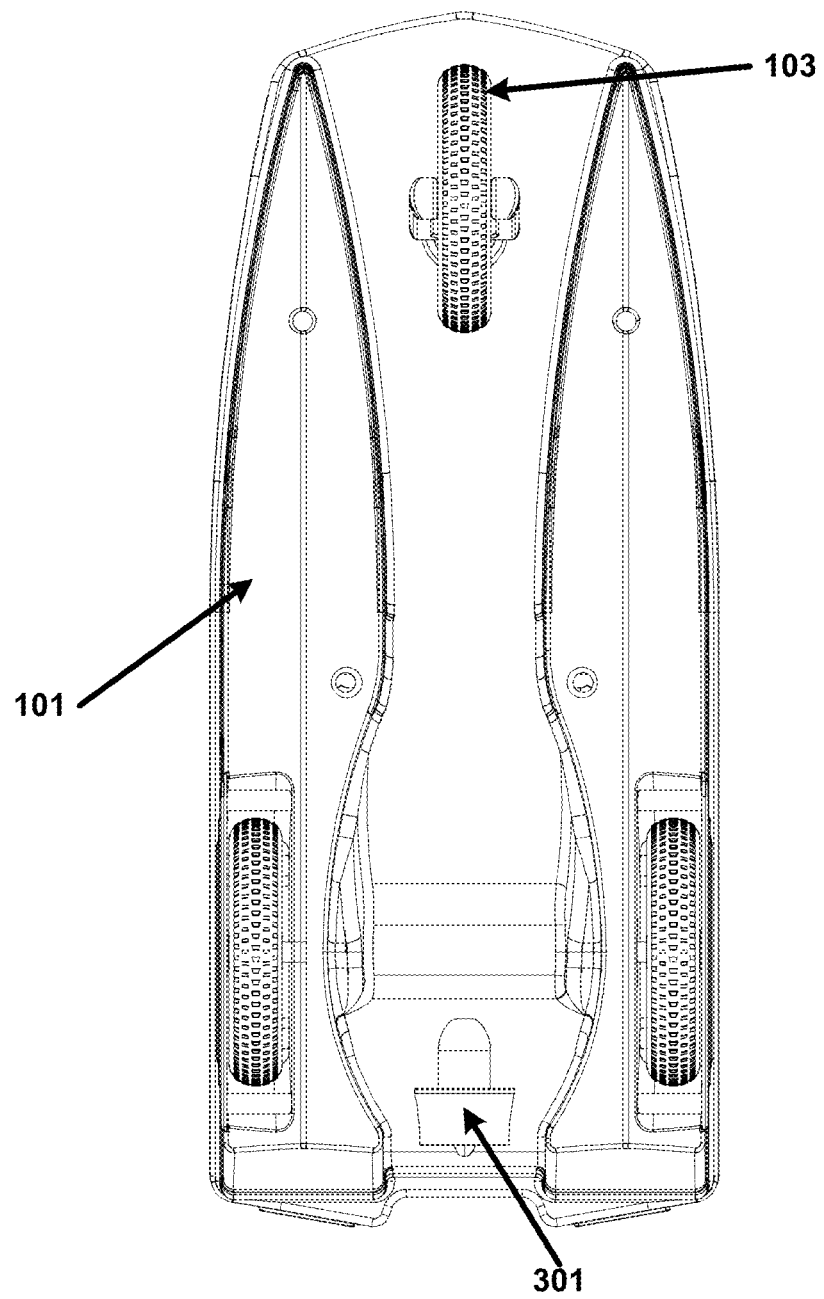
FIG. 3 shows for illustrative purposes only an example of an amphibious tricycle bottom view of one embodiment.

Amphibious Tricycle Bottom View:

FIG. 3 shows for illustrative purposes only an example of an amphibious tricycle bottom view of one embodiment. FIG. 3 shows the watertight buoyant body structure 101 with two hulls. The two hulls are positioned with one hull on either side of the front wheel in a hydrodynamic hull design with wheels 103 that are coupled to the hull with waterproof seals. FIG. 3 also shows a propeller 301 used in water operations. The propeller 301 rotates at a high rpm to propel the amphibious tricycle through the water. The amphibious vehicle 100 of FIG. 1 includes a self-contained motor that pivots for the steerage of the amphibious vehicle 100 of FIG. 1 while in the water of one embodiment.

Figure 4:
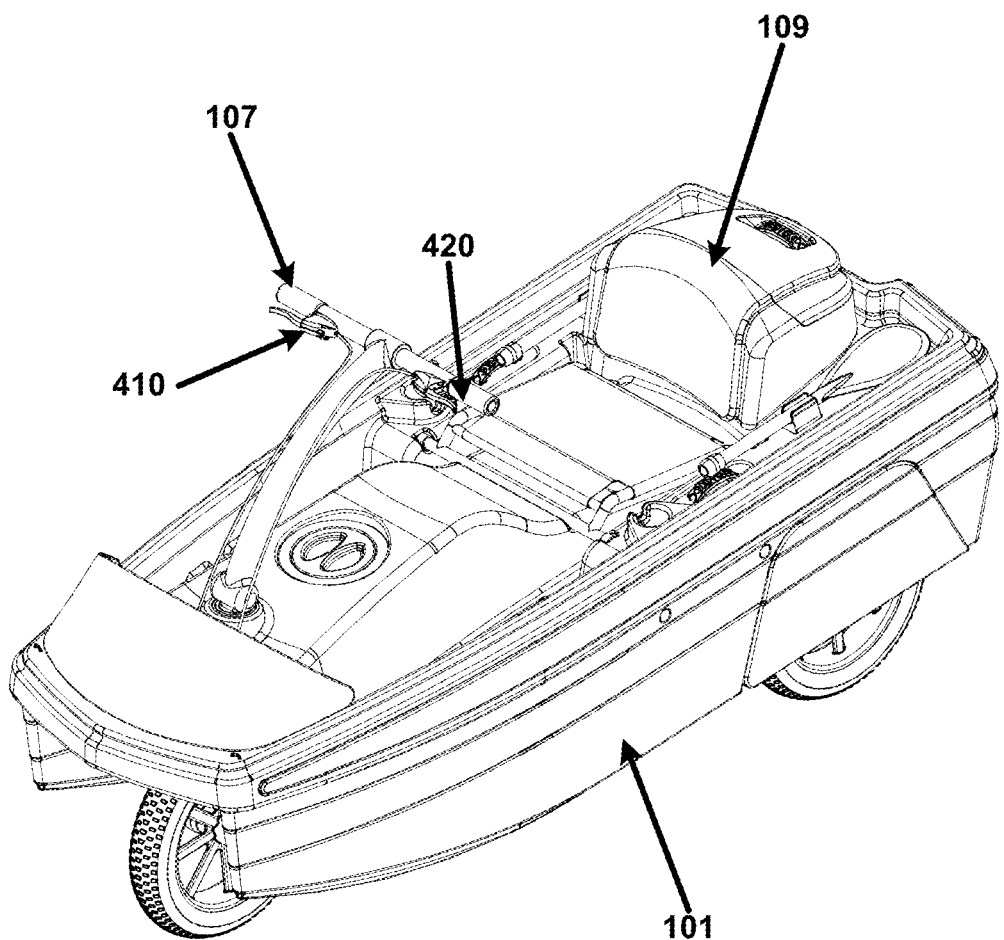
FIG. 4 shows for illustrative purposes only an example of an amphibious tricycle front deck view of one embodiment.

Amphibious Tricycle Front Deck:

FIG. 4 shows for illustrative purposes only an example of an amphibious tricycle Front Deck view of one embodiment. FIG. 4 shows the amphibious vehicle 100 of FIG. 1 includes the seat 109 includes a seat back with a storage compartment, handlebar 107, waterproof removable battery module/packs 203 of FIG. 1 (not showing), the watertight buoyant body structure 101. A handlebar seal is a waterproof seal where it passes through a waterproof structure. A throttle grip 410 is used on the right side for regulating speed. A brake lever 420 is used on the left side for regulating the braking of one embodiment.

Figure 5:
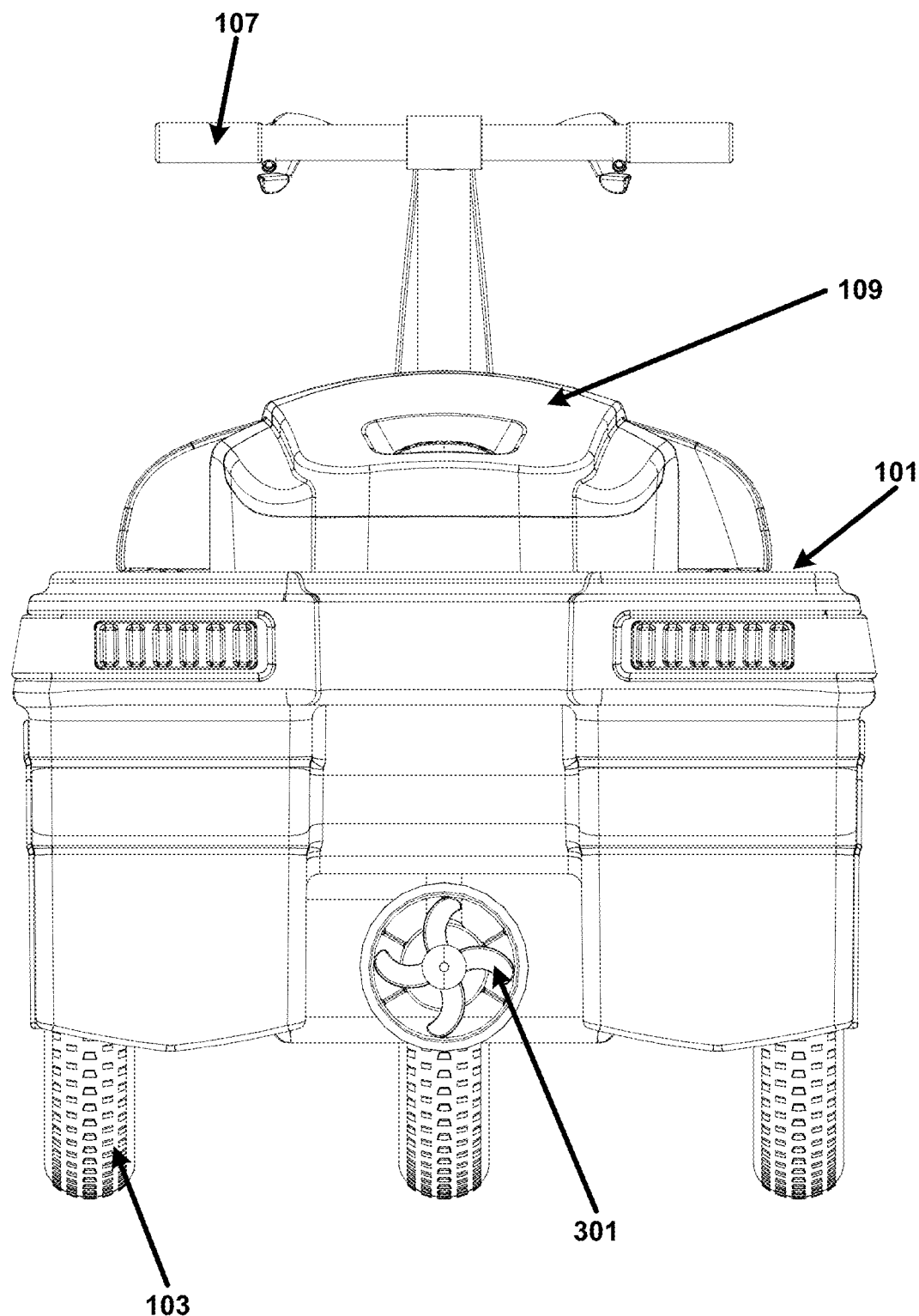
FIG. 5 shows for illustrative purposes only an example of a propeller of one embodiment.

Propeller:

FIG. 5 shows for illustrative purposes only an example of a propeller of one embodiment. FIG. 5 shows seat 109 includes a seat back with a storage compartment, handlebar 107, the watertight buoyant body structure 101, and wheels 103. Also shown is a propeller 301 used in the water mode of the amphibious operation. A self-contained motor pivots for the steerage of the amphibious vehicle 100 of FIG. 1 while in water. The propeller is connected to a shaft that has a bearing and waterproof seal where it passes through a waterproof structure.

The forward end of the propeller shaft is connected to transfer gearing that is in turn connected to the motor and causes the propeller shaft to rotate at high rpm in one embodiment. Other embodiments include a dedicated propeller motor. Gearing ratios are set to maintain the most efficient propeller rpm to provide water propulsion for the amphibious vehicle and are disengaged for land use in some embodiments. The propeller is set in a recessed flow chamber to increase the propulsive effect and protect from damage. A shroud assembly is placed around the propeller to further increase the thrust and protection of one embodiment.

Figure 6:
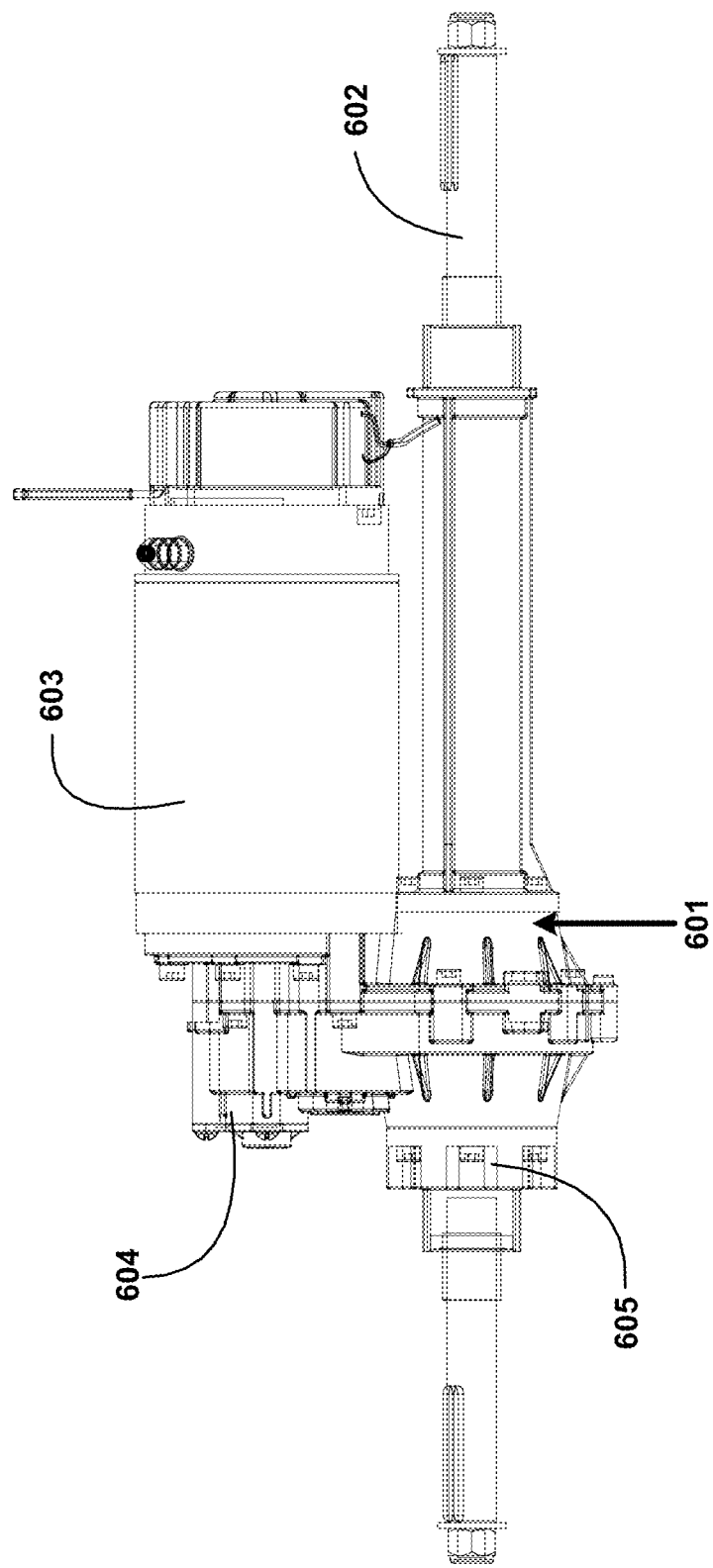
FIG. 6 shows for illustrative purposes only an example of a motor/differential/electromagnetic brake assembly of one embodiment.

Motor/Differential/Electromagnetic Brake Assembly:

FIG. 6 shows for illustrative purposes only an example of a motor/differential/electromagnetic brake assembly of one embodiment. FIG. 6 shows a motor assembly with a motor, differential, electromagnetic brake, and axle drive shafts 601. The axle drive shafts 602 connect to the wheels 103 of FIG. 1 and drive the rotation of each wheel. The axle drive shafts 602 are connected to a motor assembly with a motor 603. The axle drive shafts are connected to wheel spindle assemblies that include bearings and seals where they penetrate the rotomolded body structure.

The motor is powered with the waterproof removable battery module/packs 203 of FIG. 1. The differential 604 connected to the motor assembly with motor 603 distributes power to the wheels 103 of FIG. 1 independently to prevent skidding. Other embodiments include electric motors individually directly connected to wheel spindles. The electromagnetic brake 605 provides braking to the wheels of one embodiment.

Differential

The amphibious vehicle includes a differential. The differential allows powered axle wheels to turn at different RPMs in one embodiment. For example, when turning the outer wheel's speed will be greater than the inner wheel's speed. Not allowing differentiated speeds will cause the outer wheel to skid and skip. Other embodiments include individual wheel power.

Electromagnetic Brake

The amphibious vehicle includes an electromagnetic braking system. The electromagnetic braking system provides precise control without lock up, low power consumption, and parking brake ability activated by the electromagnetic force of one embodiment.

Figure 7A:
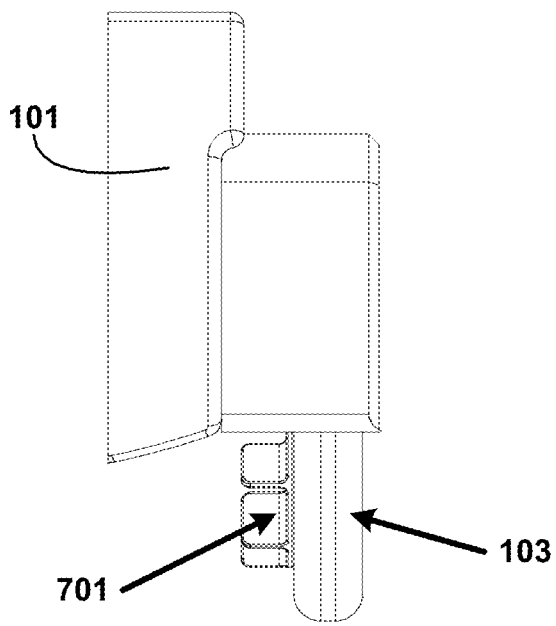
FIG. 7A shows for illustrative purposes only an example of an amphibious tricycle rear view paddle-wheel drive system of one embodiment.

Amphibious Tricycle Rear View:

FIG. 7A shows for illustrative purposes only an example of an amphibious tricycle rear view paddle-wheel drive system of one embodiment. FIG. 7A shows the amphibious tricycle watertight buoyant body structure 101 covering the wheels 103. Attached to the wheel shown is a paddle-wheel drive system 701. The paddle-wheel drive system 701 attaches to a wheel spindle and turns in conjunction with the wheel. The paddles are a source of water propulsion of one embodiment.

Figure 7B:
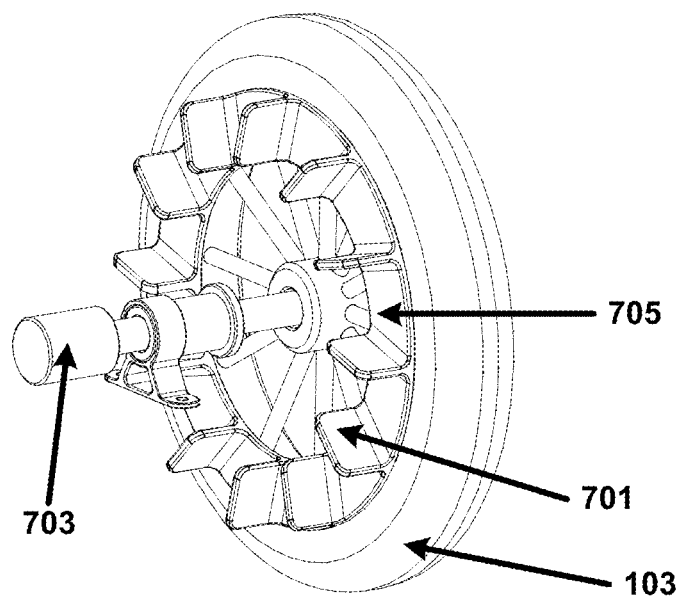
FIG. 7B shows for illustrative purposes only an example of an amphibious tricycle exploded paddle-wheel drive system view of one embodiment.

Paddle Assembly View:

FIG. 7B shows for illustrative purposes only an example of an amphibious tricycle paddle-wheel drive system view of one embodiment. FIG. 7B shows the paddle-wheel drive system 701, and an axle 703. The paddle-wheel drive system 701 is attached to a wheel spindle 705. The paddle-wheel drive system 701 rotates as the wheels 103 rotate generating propulsion to propel the amphibious vehicle through the water by its rotation of one embodiment.

Figure 8:
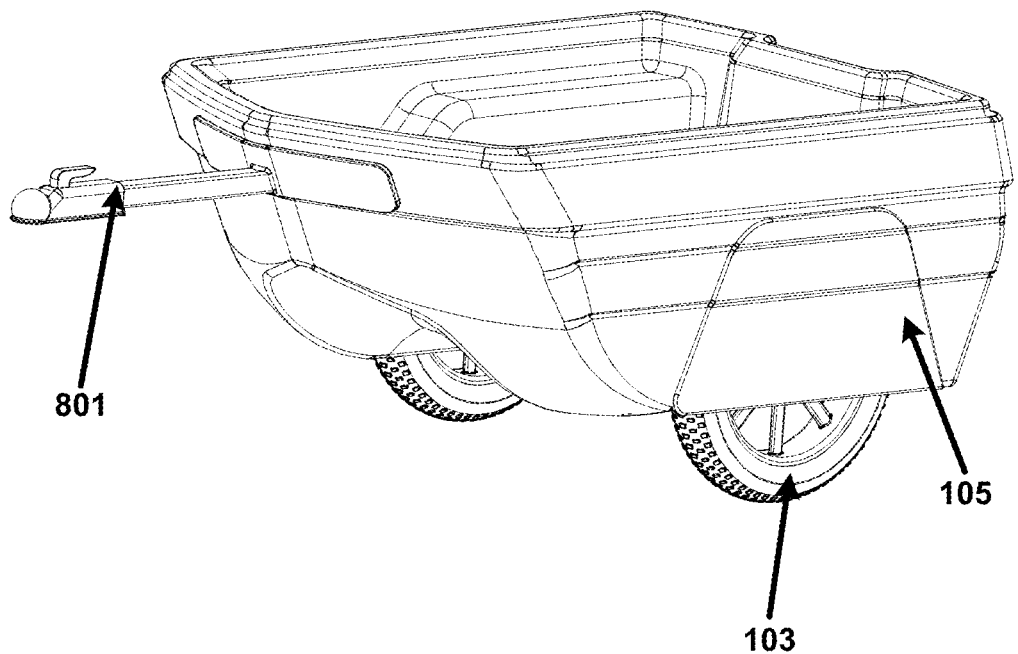
FIG. 8 shows for illustrative purposes only an example of an amphibious trailer of one embodiment.

Amphibious Trailer:

FIG. 8 shows for illustrative purposes only an example of an amphibious trailer of one embodiment. FIG. 8 shows the wheels 103, and fender 105 of a watertight buoyant trailer body structure 800. The watertight buoyant trailer body structure 800 includes a tow tongue assembly 801 for carrying loads on land and in water.

The trailer is non-powered and configured to attach and float or roll behind the amphibious vehicle system. Trailers are available in various sizes and configurations based on usage. For example, they are used to transport groceries, equipment, sports gear, people, or a variety of other cargo in one embodiment.

Figure 9A:
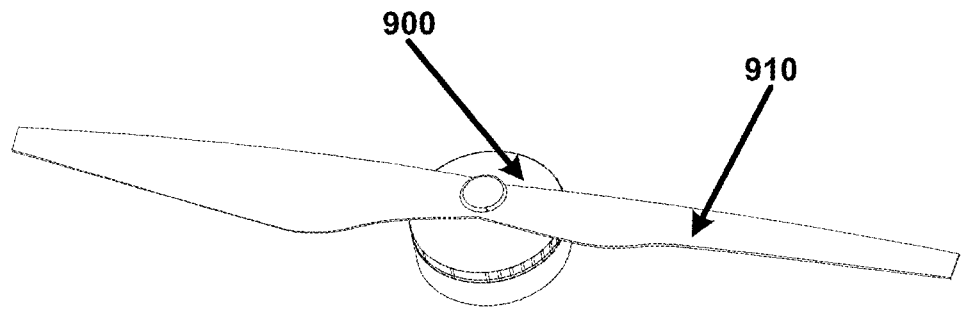
FIG. 9A shows for illustrative purposes only an example of a brushless hub motor with integrated propellers of one embodiment.

Air Propeller:

FIG. 9A shows for illustrative purposes only an example of a brushless hub motor with integrated propellers of one embodiment. FIG. 9A shows an integrated brushless heavy-duty hub motor 900 and air propeller 910. Shown is an example of a heavy-duty, brushless hub motor with a propeller attached to one embodiment. At least four motors/propellers 911 will be used in unison with multiple positions, similar to a drone, for allowing the amphibious vehicle to be airborne in one embodiment.

Figure 9B:
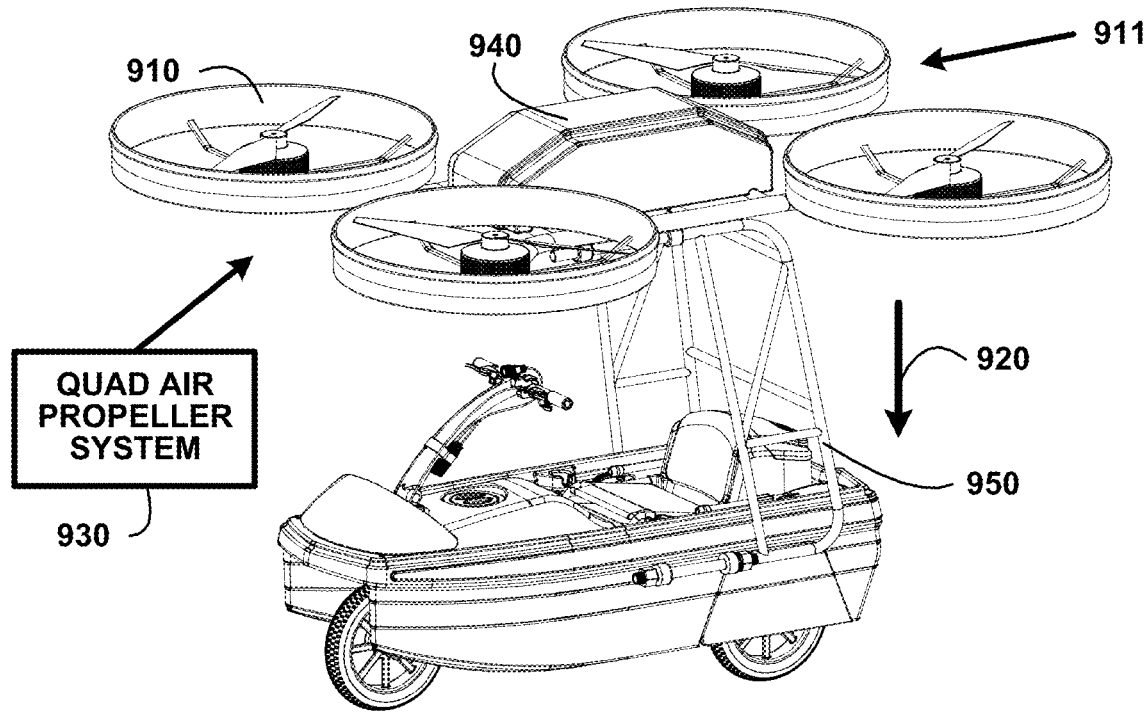
FIG. 9B shows for illustrative purposes only an example of a quad-air propeller system of one embodiment.

Quad Air Propeller System:

FIG. 9B shows for illustrative purposes only an example of a quad-air propeller system of one embodiment. FIG. 9B shows a quad air propeller system comprising At least four motors/propellers 911 units mounted to the amphibious vehicle 100. Each air propeller 910 generates thrust 920 downward to propel the amphibious vehicle 100 vertically. The quad air propeller system 930 is installed on the amphibious vehicle 100 to provide the ability to pass obstacles such as river rapids, fallen trees, avalanches, or other impediments on or in the land or water. In one embodiment the air propeller system includes more than four air propeller units. The quad-air propeller system is removably coupled 950 to the twin-hulled 102 of FIG. 1 watertight buoyant body structure 101 of FIG. 1 elevated above the user configured to hover the amphibious vehicle at a low level and move a short flight distance over obstacles of one embodiment.

Figure 10:
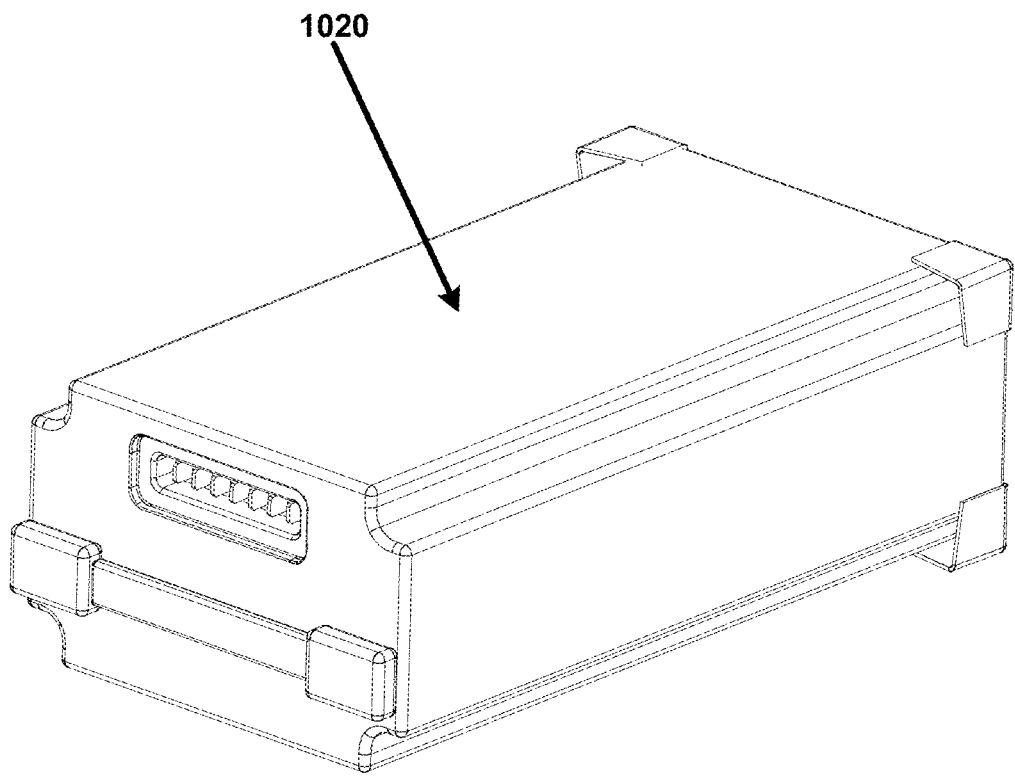
FIG. 10 shows for illustrative purposes only an example of a waterproof battery pack for independent hub motor power of one embodiment.

Waterproof Battery Pack:

FIG. 10 shows for illustrative purposes only an example of a waterproof battery pack for independent hub motor power of one embodiment. FIG. 10 shows a waterproof battery pack 1020 which is placed in the waterproof removable battery module/packs 203 of FIG. 1. Each motor/propeller will have two waterproof battery pack 1020 units with low power level alert and auto grounding safety detail. The two waterproof battery pack 1020 units will be mounted with each integrated brushless heavy-duty hub motor 900. The low power level alert includes a red flashing light and an audio sound to alert the user of the low power condition of one embodiment. At least one waterproof battery module is configured with a plurality of battery cells, and further configured within an enclosed nesting body with a top cover with a double O-ring waterproof seal.

Figure 11:
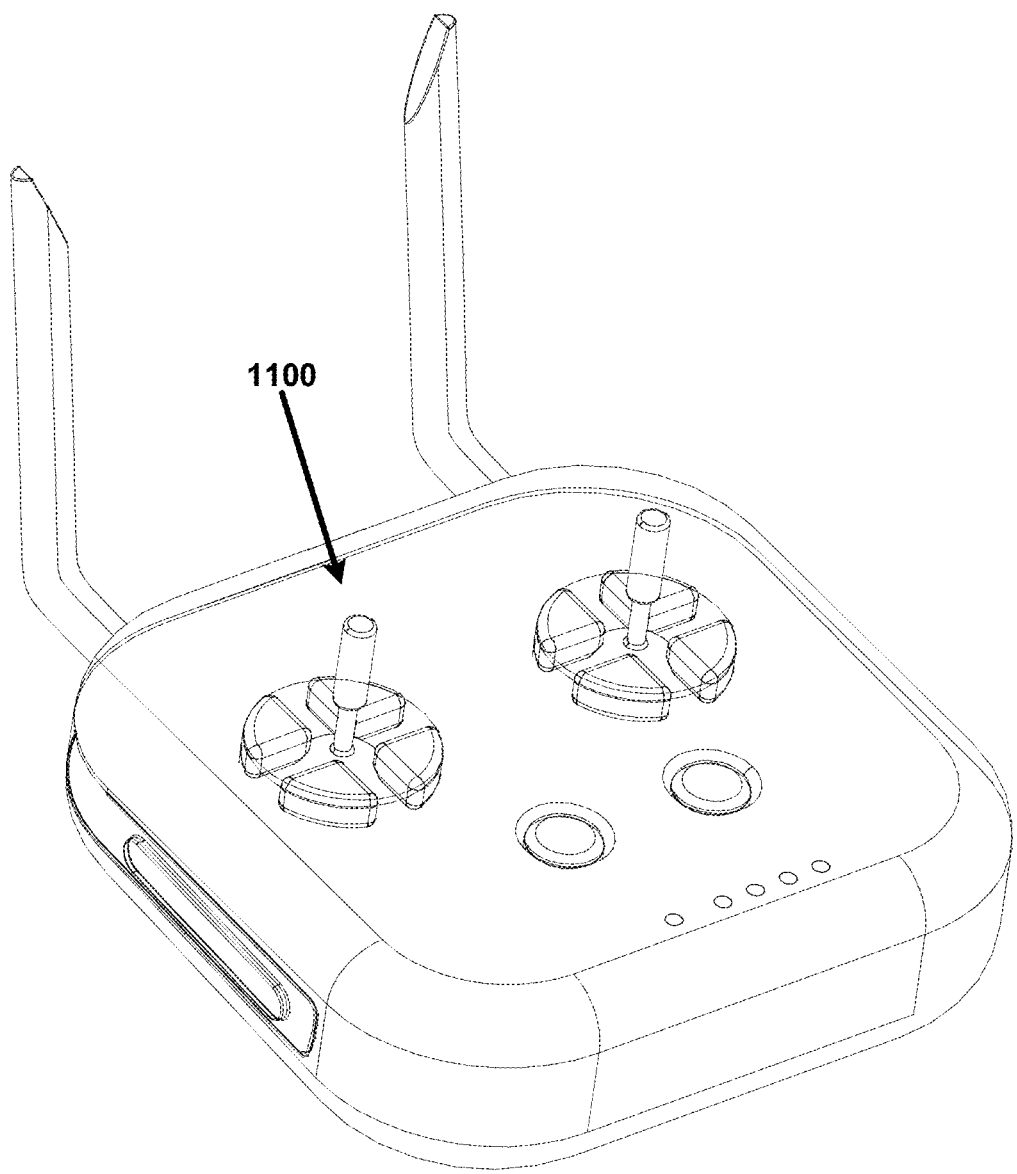
FIG. 11 shows for illustrative purposes only an example of a water-resistant, wireless 4-motor air propeller controller of one embodiment.

Wireless Controller:

FIG. 11 shows for illustrative purposes only an example of a water-resistant, wireless 4-motor air propeller controller of one embodiment. FIG. 11 shows a wireless controller 1100. The wireless controller 1100 optionally is mounted to the handlebar or a steering wheel. The wireless controller 1100 controls the 4 air propellers providing flight control similar to a drone of one embodiment.

Figure 12:
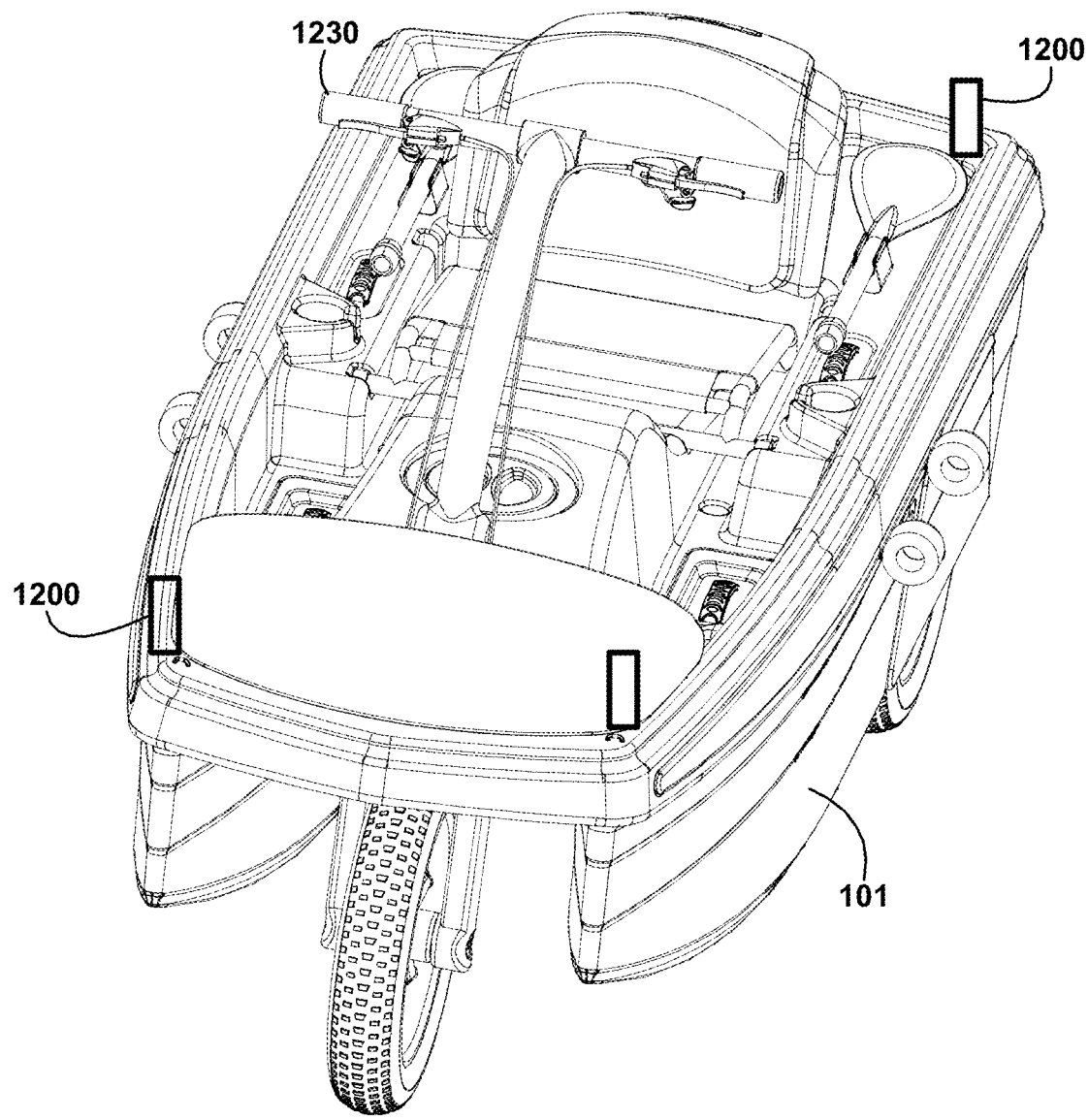
FIG. 12 shows for illustrative purposes only an example of motor mount placement for the motor/propellers of one embodiment.

Motor Mounts:

FIG. 12 shows for illustrative purposes only an example of motor mount placement for the motor/propellers of one embodiment. FIG. 12 shows the motor/propellers mounts 1200 will be at 4 corners of the amphibious vehicle 100 of FIG. 1 watertight buoyant body structure 101, elevated for water protection and extended upward for driver protection. Each air propeller has an integrated brushless heavy-duty hub motor 900 coupled to at least one waterproof battery pack 1020 of FIG. 10. The handlebar throttle 1230 is used to control the lift and direction of the air propellers. The air propellers are stabilized with horizontal connecting rods 940 of FIG. 9B to maintain their elevated air propeller positions of one embodiment.

Figure 13:
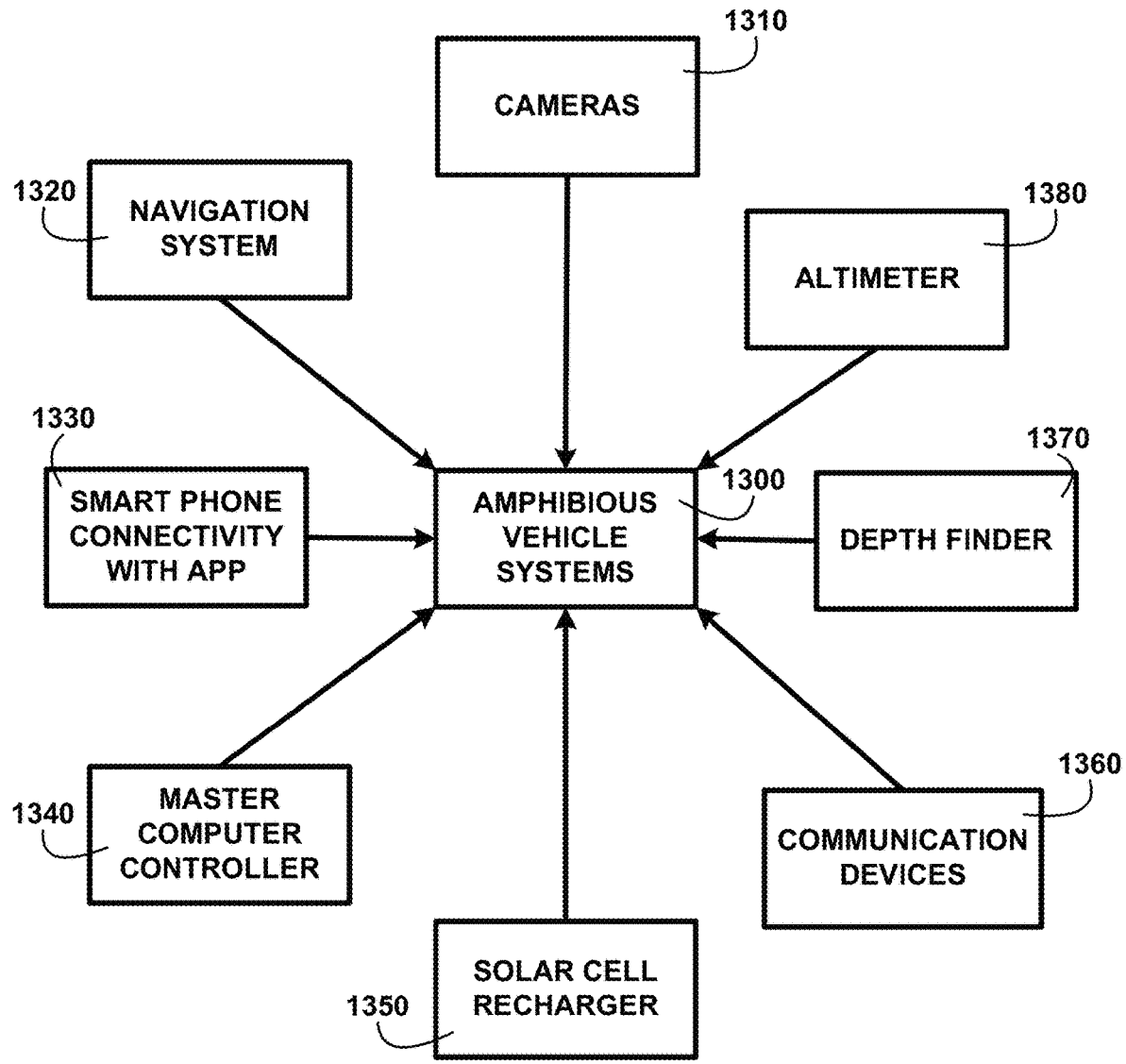
FIG. 13 shows a block diagram of an overview of amphibious vehicle features of one embodiment.

Amphibious Vehicle Features:

FIG. 13 shows a block diagram of an overview of amphibious vehicle features of one embodiment. FIG. 13 shows amphibious vehicle systems 1300 with the capability to travel on land, in water, and the air. The amphibious vehicle system 1300 includes features to assist the user in all three travel modes. The features include cameras 1310, navigation system 1320, smartphone connectivity with app 1330, master computer controller 1340, solar cell recharger 1350, communication devices 1360, depth finder 1370, and altimeter 1380 of one embodiment.

Figure 14:
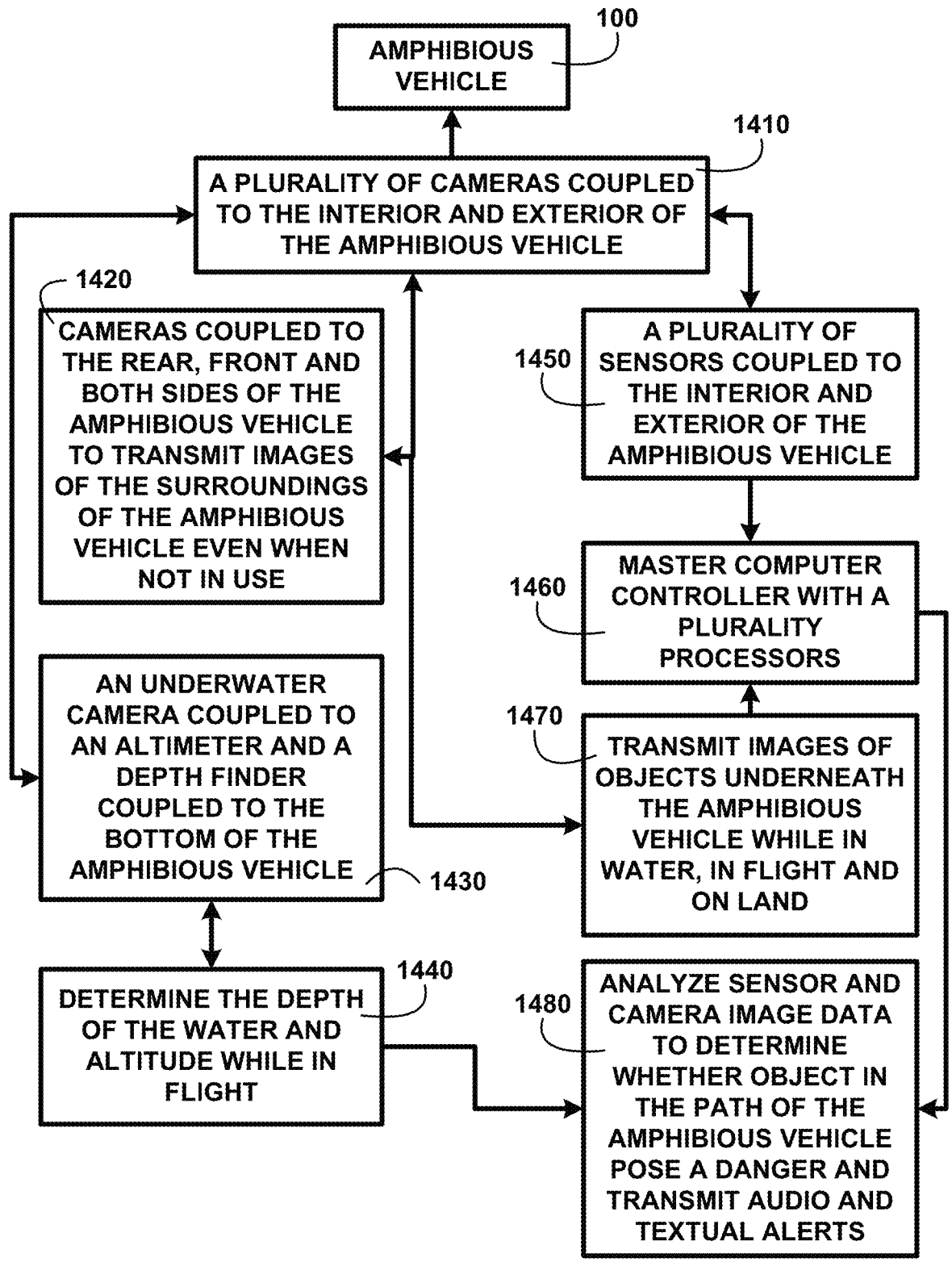
FIG. 14 shows a block diagram of an overview of a plurality of cameras of one embodiment.

The Plurality of Cameras:

FIG. 14 shows a block diagram of an overview of a plurality of cameras of one embodiment. FIG. 14 shows the amphibious vehicle 100 with a plurality of cameras coupled to the interior and exterior of the amphibious vehicle 1410. Cameras coupled to the rear, front, and both sides of the amphibious vehicle transmit images of the surroundings of the amphibious vehicle even when not in use 1420. An underwater camera coupled to an altimeter and a depth finder coupled to the bottom of the amphibious vehicle 1430 to determine the depth of the water and altitude while in flight 1440. A tow behind the camera with planning capability for search and rescue, bottom review for example search for a missing person. In one embodiment a fish finder/sonar bottom mapping device is added to assist in fishing from the amphibious vehicle.

In another embodiment, a transducer is coupled to the bottom of the watertight body assembly for use with a fish finder. Alternatively incorporating a custom fish finder coupled to the transducer. In yet another embodiment a port is included in the bottom of the watertight body assembly to drop another transducer through and use existing fish finder/sonar devices.

A plurality of sensors coupled to the interior and exterior of the amphibious vehicle 1450 to detect various environmental and physical conditions surrounding the amphibious vehicle 100. The cameras transmit images of objects underneath the amphibious vehicle while in water, in flight, and on land 1470 via the app to the master computer controller. The master computer controller with a plurality of processors 1460 is used to analyze sensor and camera image data to determine whether the object in the path of the amphibious vehicle poses a danger and transmit audio and textual alerts 1480 of one embodiment.

Figure 15:
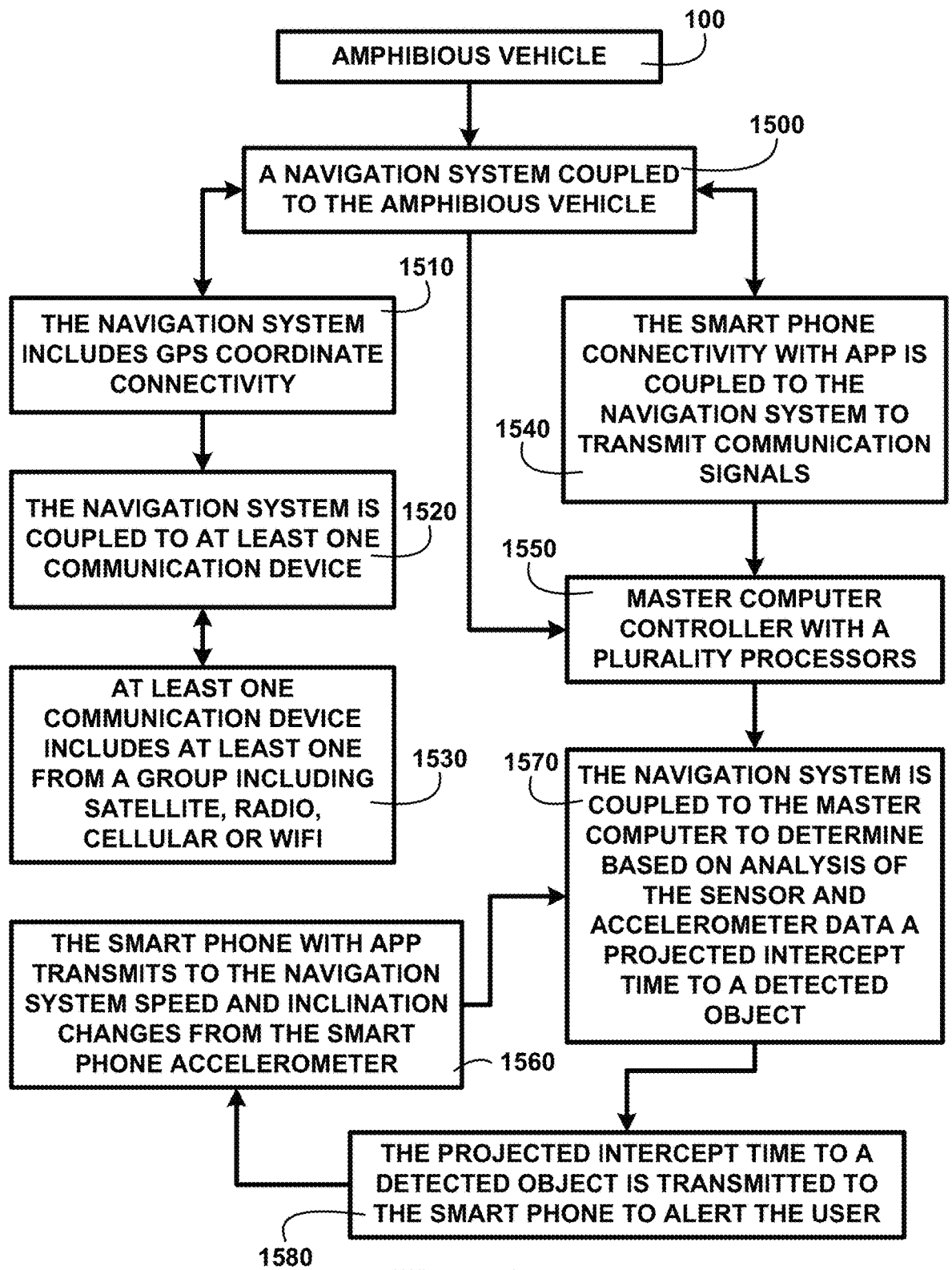
FIG. 15 shows a block diagram of an overview of a navigation system of one embodiment.

A Navigation System:

FIG. 15 shows a block diagram of an overview of a navigation system of one embodiment. FIG. 15 shows the amphibious vehicle 100 includes a navigation system coupled to the amphibious vehicle 1500. Wherein the navigation system includes GPS coordinate connectivity 1510. Wherein the navigation system is coupled to at least one communication device 1520. Wherein at least one communication device includes at least one from a group including satellite, radio, cellular, or WIFI 1530. Wherein the smartphone connectivity with the app is coupled to the navigation system to transmit communication signals 1540.

The master computer controller with a plurality of processors 1550 analyses the data from the cameras and sensor and smartphone devices. Wherein the smartphone with app transmits to the navigation system speed and inclination changes from the smartphone accelerometer 1560. Wherein the navigation system is coupled to the master computer to determine based on analysis of the sensor and accelerometer data a projected intercept time to a detected object 1570. Wherein projected intercept time to a detected object is transmitted to the smartphone to alert the user 1580 of one embodiment.

A smartphone application is wirelessly coupled to the controller to remotely control the vehicle. The smartphone application in one embodiment includes several features to remotely control the vehicle. In one embodiment, a GPS tracking sensor with location capabilities is coupled to the vehicle and tracks the location of the vehicle through the smartphone application. The user can input a route with GPS coordinates and the GPS tracking sensor with location capabilities coupled to the amphibious vehicle 100 will operate the vehicle in autonomous driving mode with the user onboard and when the user is not onboard.

In another embodiment, the smartphone application includes access to the cameras on the vehicle to allow a user to remotely view the surroundings in real time of the vehicle for security purposes. For example, a remote user will be able to tell if someone or something is damaging the vehicle and be able to record the events that occurred during that time. The electronics also include an SMS emergency messaging/locator referred to as an Emergency Position Indicating Radio Beacon (EPIRB).

In one embodiment the electronics package includes route mapping with date/time, GPS coordinates, forecasts of weather conditions, lunar phases, tide stage, and stop pinpoints with images and comments. The data is all uploaded automatically to cloud storage using an application programming interface (API).

In addition, the camera is used to record events in real-time as the vehicle is driving and moving across the terrain. These events are also live-streamed. The smartphone application is also used to remotely control and autonomously drive the vehicle and summon the vehicle to the user. In another embodiment, the smartphone application is used to remotely determine vital signs of the equipment of the vehicle, such as checking the charge level on the vehicle or other vital signs are tracked remotely to make sure that the vehicle is operating in proper condition.

In another embodiment, the vehicle has solar cells and solar panels to recharge the battery. In another embodiment, the vehicle includes sensors and RF detectors to determine objects that are nearby that could cause damage or cause the vehicle to collide into and to assist during autonomous driving of the vehicle of one embodiment.

Figure 16:
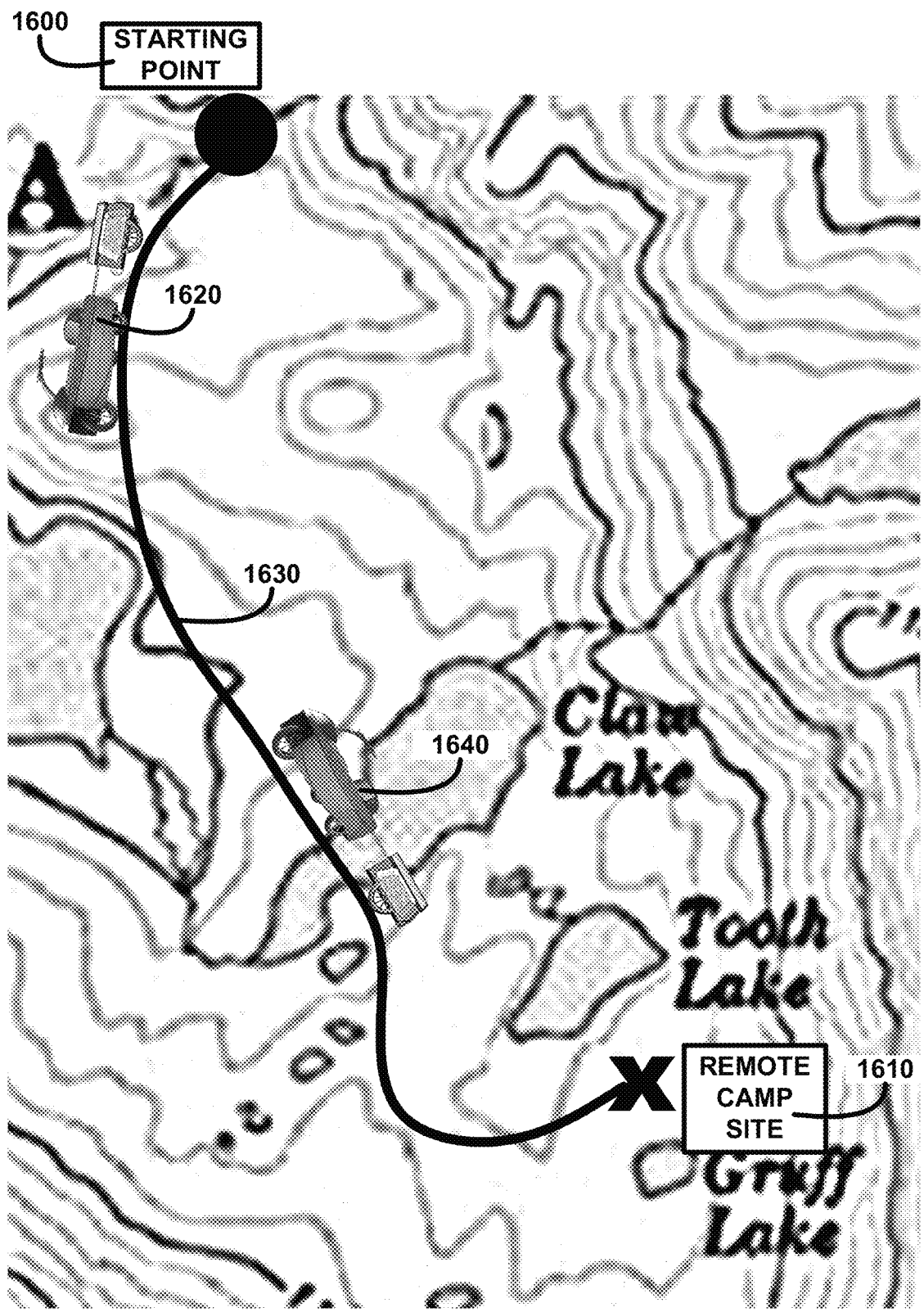
FIG. 16 shows for illustrative purposes only an example of an autonomous driving mode of one embodiment.

An Autonomous Driving Mode:

FIG. 16 shows for illustrative purposes only an example of an autonomous driving mode of one embodiment. FIG. 16 shows a map of a planned camp trip using the amphibious vehicle and amphibious trailer in autonomous driving mode. The user can input a route with GPS coordinates and the GPS tracking sensor with location capabilities coupled to the amphibious vehicle 100 of FIG. 1 will operate the vehicle in autonomous driving mode with the user onboard and when the user is not onboard. For example, two people were to meet at a known starting point 1600 location and trek through terrain to a remote campsite 1610. The first person arrived and received a message that the second person would be late arriving.

The first person loads their camping equipment in the amphibious trailer attached to the amphibious vehicle 1620. The GPS tracking sensor with location module records the original route taken 1630 including flying over obstacles and traversing water encountered. The second person arrives at the known starting point 1600 location and informs the first person. The first person activates the autonomous driving mode and the amphibious vehicle follows the recorded route 1640 to the known starting point 1600 location. An autonomous driving mode device coupled to a GPS tracking sensor with a location device configured to record a route taken by the user including flying over obstacles and traversing water encountered and further configured to autonomously drive the amphibious vehicle along a GPS-tracked recorded route.

The second person loads their camping equipment in the emptied amphibious trailer. The second person messages the first person that they are ready to go. Using the app on the first person's smartphone the amphibious vehicle begins the autonomous drive to the remote campsite 1610 following the original route taken 1630 and the two persons are united of one embodiment.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. An amphibious vehicle system, comprising:
a unibody, one-piece watertight buoyant body structure, filled with closed cell foam to create buoyancy in case of leakage, configured to carry at least one user and cargo;
at least one motor drive system having at least one waterproof battery module, replaceable in a watertight compartment, coupled to the one-piece watertight buoyant body structure configured to drive at least one propulsion system to propel the amphibious vehicle with at least three wheels on land;
a twin hulled front portion segueing to a single rear hull housing the motor and differential with water channels to allow water flow to a propeller;
a plurality of cameras including an underwater camera coupled to an altimeter and a depth finder coupled to a bottom section of the amphibious vehicle configured to determine a depth of water and an altitude while in flight;
at least one boat propeller water propulsion system coupled to a self-contained motor that pivots configured to propel the amphibious vehicle through water;
wherein the self-contained motor is configured to steer the amphibious vehicle in water;
a steering system that controls wheels and propellers simultaneously; and
an autonomous driving mode device coupled to a GPS tracking sensor with a location device configured to record a route taken by the user including flying over obstacles and traversing water encountered and further configured to autonomously drive the amphibious vehicle along a GPS-tracked recorded route.

2. The amphibious vehicle system of claim 1, further comprising a navigation system having electronic devices coupled to the amphibious vehicle to gather and display data to the at least one user, and further configured with route mapping and to provide the user with forecasts of weather and conditions.

3. The amphibious vehicle system of claim 1, wherein the unibody is made of molded plastic, metal, carbon, and other water-resistant materials.

4. The amphibious vehicle system of claim 1, further comprising a plurality of sensors coupled to an interior and exterior sections of the amphibious vehicle configured to detect various environmental and physical conditions surrounding the amphibious vehicle.

5. The amphibious vehicle system of claim 1, further comprising a metal structural brace coupled to the watertight buoyant body structure configured to provide additional support for heavy load carrying capacity.

6. An amphibious vehicle system, comprising:
a unibody, one-piece watertight buoyant body structure, filled with closed cell foam to create buoyancy in case of leakage, configured to carry at least one user and cargo;
at least one motor drive system having at least one waterproof battery module, replaceable in a watertight compartment, coupled to the watertight buoyant body structure configured to drive at least one propulsion system to propel the amphibious vehicle with at least three wheels on land;
a twin hulled front portion segueing to a single rear hull housing the motor and differential with water channels to allow water flow to a propeller;
at least one boat propeller water propulsion system coupled to a self-contained motor that pivots configured to propel the amphibious vehicle through water;
wherein the self-contained motor is configured to steer the amphibious vehicle in water;
a steering system configured to control wheels and propellers simultaneously; and
an air propeller system having at least four air propellers removably coupled to the unibody elevated above the user configured to hover the amphibious vehicle at a low level and move a short flight distance over obstacles.

7. The amphibious vehicle system of claim 6, wherein the at least one waterproof battery module is configured with a plurality of battery cells, and further configured within an enclosed nesting body with a top cover with a double O-ring waterproof seal.

8. The amphibious vehicle system of claim 6, wherein the air propeller system propeller is configured to be rotated by an integrated brushless hub motor powered by at least one waterproof battery module.

9. The amphibious vehicle system of claim 6, further comprising at least one paddle-wheel drive system water propulsion system coupled to the at least three wheels of the amphibious vehicle configured to rotate as the wheels rotate generating propulsion to propel the amphibious vehicle through water.

10. The amphibious vehicle system of claim 6, further comprising a plurality of cameras coupled to a rear section, front section, and both sides of the amphibious vehicle to transmit images to an app on a user's mobile device of surroundings of the amphibious vehicle even when not in use.

11. The amphibious vehicle system of claim 6, further comprising a metal structural brace coupled to the watertight buoyant body structure configured to provide additional support for heavy load carrying capacity.

* * * * *